UNITED STATES PATENT OFFICE.

JOHN V. WORTHINGTON AND ALFRED W. T. HYDE, OF REGENTS PARK, LONDON, ENGLAND, ASSIGNORS TO THE DUNLOP RUBBER COMPANY, LIMITED, OF REGENTS PARK, LONDON, ENGLAND.

TREATMENT OF RAW RUBBER.

1,360,486.        Specification of Letters Patent.       Patented Nov. 30, 1920.

No Drawing.      Application filed May 17, 1920. Serial No. 381,938.

*To all whom it may concern:*

Be it known that we, JOHN VIGERS WORTHINGTON and ALFRED WILLIAM TOVEY HYDE, both subjects of the King of Great Britain, residing at Dunlop House, 1 Albany street, Regents Park, in the county of London, England, have invented certain new and useful Improvements in or Relating to the Treatment of Raw Rubber, of which the following is a specification.

This invention relates to the treatment of raw rubber and its main object is to produce rubber of uniform degree of softness.

Difficulty is experienced in the manufacture of rubber owing to variations in the quality of the raw rubber chiefly in respect of hardness and degree of polymerization due mainly to the different methods employed in the process of coagulating the latex.

The result of this has been that the raw rubber has had to be worked in the rubber mills for varying periods in the attempt to obtain a definite and constant degree of softness. This method is unsatisfactory chiefly because it requires greatly varying times and amounts of energy. such variations being undesirable from the point of view of mill output and cost of production.

The present invention provides a convenient process for eliminating the variations in the physical condition of the raw rubber as received from the plantations as well as a convenient method of drying the rubber.

According to our invention the raw rubber is heated in an inert non-oxidizing atmosphere, for example, live steam, free from air, which may be at any desired pressure, and then dried, preferably, without the application of external heat.

The raw rubber to be treated may be placed in a suitable chamber or container provided with means for extracting air therefrom and for introducing steam thereto. The air is extracted from the container before the introduction of steam. The pressure at which the steam is used may vary and the time during which the treatment must go on depends on the pressure employed. Thus, it has been found suitable in the case of some samples of rubber, to treat the raw material with steam under a pressure of ten to fifteen pounds per square inch for seven hours while, in other cases, good results have been obtained by treatment for three hours with steam at a pressure of sixty pounds per square inch. For any particular batch of raw rubber, the best results are obtained by taking viscosity tests, from time to time, from a sample. The heating, however, need not be uniform especially as time may be varied.

When the steam treatment is completed, the supply is cut off and communication made through suitable means with a vacuum or exhausting apparatus which operates to effect the drying. The rubber is then ready to be worked in the mills.

The viscosity tests above mentioned may for example be performed with 1 per cent. of rubber in benzene in the following manner:—The rubber is cut in small pieces and placed in the benzene in a flask, which is shaken at intervals until the rubber has completely dissolved; it is then allowed to settle and the solution carefully decanted into a viscometer of the Ostwald type. The test is carried out in a water bath thermostatically controlled.

When the rubber has been steam heated, the sample after being cut into small pieces must be dried in a suitable oven at a temperature of 100° Fahrenheit.

For the purpose of controlling the steam heating, a viscosity curve should first be constructed by plotting viscosity against time, commencing with the untreated rubber and ending with the rubber which has reached the practical limit of softness. In order to test the treatment required by any given lot of rubber it is preferred to construct a portion of the viscosity curve for tests on a small representative sample heated for different periods. From this curve the required time for the bulk of the lot can be determined.

What we claim and desire to secure by Letters Patent of the United States is:—

1. A method of treating raw rubber consisting in heating the rubber in an inert non-oxidizing atmosphere.

2. A method of treating raw rubber consisting in subjecting the rubber to the action of steam and then drying same, preferably without the application of external heat.

3. A method of treating raw rubber consisting in placing the rubber in a container from which air is exhausted and to which steam is then admitted under suitable pressure and effecting communication between said container and a vacuum or exhausting apparatus for extracting the moisture and subsequently drying the rubber.

J. V. WORTHINGTON.
A. W. T. HYDE.